United States Patent [19]

Stacy

[11] Patent Number: 5,052,330
[45] Date of Patent: Oct. 1, 1991

[54] BREADER FOR COATING EDIBLE FOOD PRODUCTS WITH FRESH BREAD CRUMBS

[75] Inventor: Robert M. Stacy, Sandusky, Ohio
[73] Assignee: Stein, Inc., Sandusky, Ohio
[21] Appl. No.: 640,704
[22] Filed: Jan. 14, 1991
[51] Int. Cl.$^5$ .................. B05C 5/02; B05C 19/00
[52] U.S. Cl. .................. 118/16; 99/494; 99/450.1; 118/24; 118/312
[58] Field of Search .................. 99/494, 450.1; 118/13, 118/16, 19, 24, 31, 312; 427/195

[56] References Cited

U.S. PATENT DOCUMENTS

| | | | |
|---|---|---|---|
| 3,045,640 | 7/1962 | Hill et al. | 118/24 |
| 3,404,659 | 10/1968 | Croston | 118/24 |
| 3,759,218 | 9/1973 | Korstvedt | 118/312 |
| 3,885,519 | 5/1975 | Orlowski | 118/16 |
| 4,210,074 | 7/1980 | Laughman | 99/494 |
| 4,245,580 | 1/1981 | Okawara | 118/24 |
| 4,333,415 | 6/1982 | Miller et al. | 118/16 |
| 4,496,084 | 1/1985 | Booth et al. | 118/24 |
| 4,497,244 | 2/1985 | Koppens | 99/450.1 |
| 4,662,306 | 5/1987 | Miller | 118/16 |
| 4,936,248 | 6/1990 | Miller | 118/312 |

FOREIGN PATENT DOCUMENTS

2317747 10/1974 Fed. Rep. of Germany ........ 99/494
2506054 8/1976 Fed. Rep. of Germany ........ 99/494

Primary Examiner—Timothy F. Simone
Attorney, Agent, or Firm—Oldham & Oldham Co.

[57] ABSTRACT

The invention describes a coating machine which includes an endless pervious conveyor belt supported in an elongated frame which provides a food product conveyance path within the machine. A hopper is disposed above the food product conveyance path in which an amount of a coating material is provided to generate a falling curtain of bread crumbs or the like to cover the top and sides of food product pieces passing along the food product conveyance path. The machine also preferably includes a circular drum type conveyor which is rotatably supported along the elongated frame adjacent the hopper and includes a plurality of pockets formed therein which open into the interior of the machine and the hopper. Conveyors are provided in both the elongated frame and hopper to distribute coating material from the frame enclosure to the circular conveyor which will in turn distribute coating material to the hopper to generate the upper layer of breading material. The machine also includes structure to distribute breading material within the frame enclosure so as to continuously and effectively generate a bottom layer of coating material on the food product conveyance path while avoiding congestion of the coating material. The distribution system of the machine is readily adaptable for different kinds of breading materials and allows utilization of the machine for fresh bread crumbs with handling thereof performed in a gentle manner while avoiding congestion or packing of such breading material.

13 Claims, 6 Drawing Sheets

BREADER FOR COATING EDIBLE FOOD PRODUCTS WITH FRESH BREAD CRUMBS

BACKGROUND OF THE INVENTION

This invention relates to a breading apparatus for applying edible fresh bread crumbs or a variety of other coating materials to surface coat food products. More particularly, the breader of the invention allows a uniform coating of a breading material such as fresh bread crumbs to surface coat a solid core of food which has first been coated with a liquid batter.

In the field of large scale food preparation and processing, batter coating and breading processes are conventionally utilized for a variety of food products which are to be cooked by deep fat frying. Such food products usually comprise sea foods, poultry, red meats and vegetables, but a variety of other food products may also be desirably batter coated and breaded to provide an aesthetically appealing food product. Apparatus are available for batter coating such food products wherein common batters are made from corn and/or wheat flours, starches, seasonings and gums plus an amount of water, which are mixed in various proportions as desired by the food processor. Similarly, coating materials come in a variety of different forms, but may be a dry breading formulation of grain, flours, seasonings and spices, or ground cereal, dried vegetables or other coating materials. Various particular types of breading materials may comprise common bread crumbs in a granular form, wherein the granules are 1/16th of an inch or less in major dimension and may be termed a "flour" breading material. Such granular bread crumbs are usually termed "free flowing" because they will not pack into clumps, nor will they self-bridge over an opening slightly larger than the granules. Another type of bread crumb is referred to as "Japanese style" breading material or J-crumb breading which comprise material in larger granular form wherein the integrity of the granular form is desired to be maintained, and the bread crumbs have physical characteristics such that they may pack into clumps or self-bridge over openings.

More recently, it has been desirable in the field of large scale food processing, to use what is referred to in the art as "fresh bread" crumbs which are made from fresh bread and create unique problems in attempting to coat food products in a machine breading application. In contrast to the "dry formulation" of common bread crumbs mentioned above, the "fresh bread" crumbs usually have a substantial moisture content, and thus require that the bread crumb coating apparatus be more gentle in its distribution of the bread crumbs within the breading machine as well as in the application of the crumbs to the food product to be coated. If the bread crumb apparatus operates too harshly upon fresh bread crumbs, the individual crumbs have a tendency to combine together to form doughballs which are undesirable as a crumb coating for food products and also creates significant problems in the operation of the machine. The particle sizes of fresh bread crumbs are generally larger and the crumbs are somewhat pliable as compared to typical dry bread crumbs or the J-crumb breading material. For this reason, the breading apparatus must also be gentle in its distribution and coating so as to prevent the crumbs from being ground into smaller granular form within the apparatus.

In the assignees U.S. Pat. No. 4,936,248, a breader for coating edible food products with fresh bread crumbs was described to enable complete and continuous coating of battered food products which are carried on a moving conveyor belt. The breading machine as described included bread crumb distribution apparatus which was operable to more gently process "fresh bread" crumbs. This breader creates a bottom layer of breading which is formed on a moving product conveyor belt onto which battered food product pieces to be breaded are placed. The moving belt then carries the product under a falling curtain of bread crumbs which covers the top and sides of the product pieces. The apparatus includes a drum type conveyor and associated belt conveyors which are operable to provide the top and side coating of "fresh bread" crumbs or other breading material to the food products on the product conveyor. The drum type conveyor enables the fresh bread crumb material to be lifted for disposition on the upper surfaces of food products in a gentle manner so as to avoid any appreciable deterioration to the breading material in the distribution to the upper surfaces of the food product.

Although the breader as described in this prior patent enabled handling of fresh bread crumb material with significantly better results, various problems were encountered in proper distribution of the breading material. For example, due to the physical characteristics of the fresh bread crumb material, some degradation or deterioration of the breading material was still found to be evident in use for large scale food processing and preparation. Additionally, because of the moisture content of the fresh bread crumb material, it was found that the breading material became congested and may have had a tendency to pack thereby disabling proper distribution of the breading material within the apparatus. It was further found that proper distribution of the breading material upon initial start-up and subsequent addition of breading material did not provide for immediate and even distribution within the apparatus.

Various other breading machines are shown in prior assignees U.S. Pat. Nos. 3,547,075 and 4,128,160, wherein a bottom layer of breading is formed on a moving product conveyor belt onto which battered food products may be disposed to provide a bottom layer of breading material thereon. A top layer of breading material is then made to fall on the food products as they pass through the apparatus on the product conveyor belt, after which a series of pressure rollers may be made to press upon the top layer of bread crumbs for retention of the breading material on the food product. Excess bread crumbs are then removed, generally with vibrators and/or air curtains, and the coated and breaded food product is discharged from the breading machine. Again, although these breading machines may be sufficient for certain types of breading materials, they may not satisfactorily or adequately process and distribute "fresh bread" type breading material for proper application to food products without appreciable deterioration of the breading material.

SUMMARY OF THE INVENTION

Based upon the foregoing, there is found to be a need to provide a breader for coating edible food products with fresh bread crumbs which will avoid deficiencies found in prior art breaders. It is therefore a main object of the invention to provide a breader for coating edible food products with fresh bread crumbs or other breading materials which will effectively distribute and handle the fresh bread crumbs so as to avoid any appreciable deterioration or degradation of the breading material.

Another object of the invention is to provide a breading machine especially designed to continuously coat battered food product with fresh bread crumbs or other breading material wherein the apparatus will allow proper and effective distribution of the breading material to facilitate continuous and even coating of food products while avoiding packing or other congestion of the breading material within the apparatus.

It is another object of the invention to provide a breading machine which will continuously and effectively coat battered food products with fresh bread crumbs or other breading material, wherein initial setup and the addition of breading material in large scale food production operations is facilitated to allow quick and efficient distribution of breading material within the apparatus.

Yet another object of the invention is to provide a breading machine including a breading distribution system which more effectively and uniformly achieves proper distribution of breading material without degradation or deterioration of the breading material and avoids packing of the breading material or similar problems.

These and other objects are accomplished by a breading machine which includes an endless pervious conveyor belt supported in an elongated frame which provides a food product conveyance path within the machine. A hopper is disposed above the food product conveyance path in which an amount of breading material is provided to generate a falling curtain of bread crumbs to cover the top and sides of food product pieces passing along the food product conveyance path, wherein the falling curtain of bread crumbs extends along the entire width of the conveyance path. The machine also includes a circular drum type conveyor which is rotatably supported along the elongated frame adjacent the hopper which includes a plurality of pocket means formed therein which open into the interior of the machine and the hopper. Conveyance means are provided in both the elongated frame and hopper to distribute breading material from the frame enclosure to the circular conveyor which will in turn provide breading material to the hopper to be conveyed to a position to generate the upper layer of breading material as previously described. The machine also includes means to distribute breading material within the frame enclosure so as to continuously and effectively generate a bottom layer of breading material on the food product conveyance path while avoiding congestion of the breading material. The distribution system of the breading machine is readily adaptable for different kinds of breading materials and allows utilization of the machine for a fresh bread crumbs with handling thereof performed in a gentle manner while avoiding congestion or packing of such breading materials.

BRIEF DESCRIPTION OF THE DRAWINGS

The objects and advantages as previously described as well as others will become apparent to unskilled in the art upon a further reading of the following detailed description in conjunction with the drawings, wherein.

DETAILED DESCRIPTION OF THE INVENTION

Figure 1:
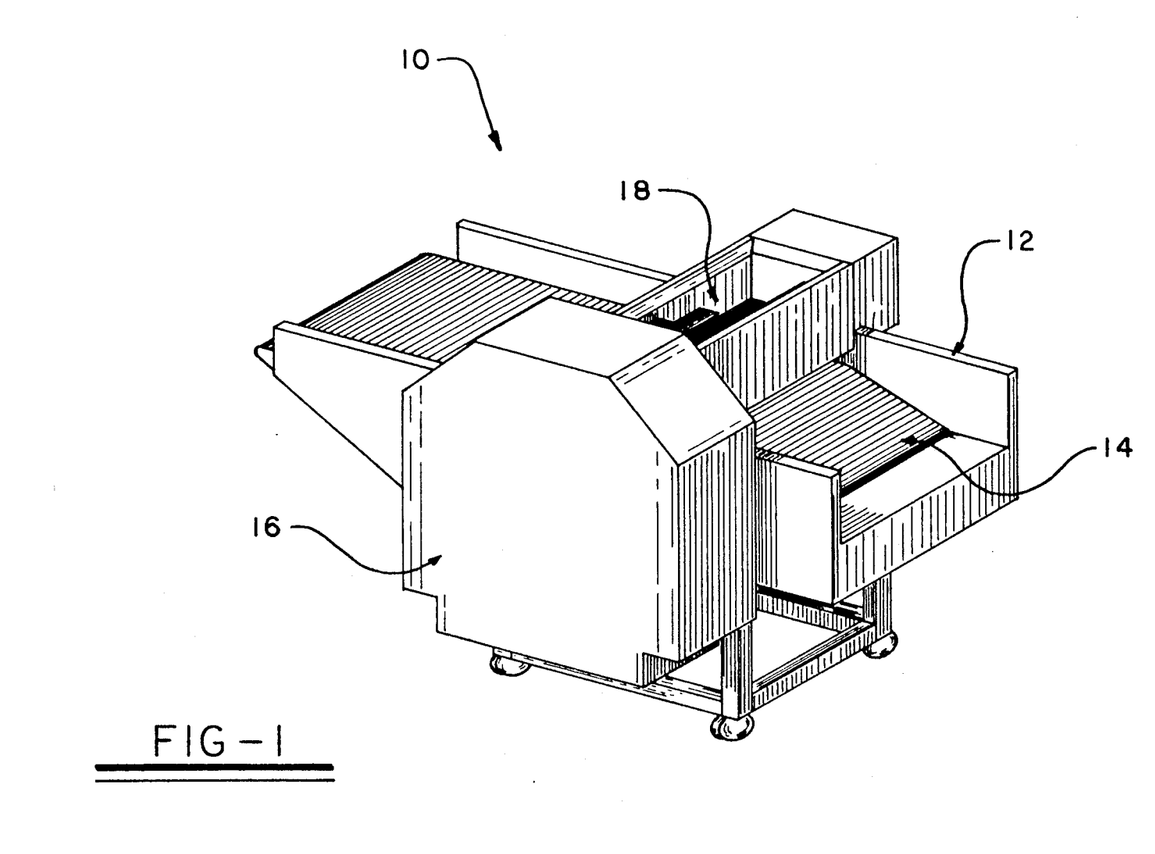
FIG. 1 is a perspective view of the breading machine of the present invention.

Turning now to the drawings, the breading machine 10 of the invention is generally shown in FIG. 1 and includes a frame 12 defining an enclosure and including an endless pervious first conveyor system 14 supported in the frame 12 and extending substantially the full length of frame 12. The conveyor belt 14 as will be hereinafter more fully described, creates a plurality of belt runs within the frame 12 so as to carry food product along the length of the breading machine 10 as well as to facilitate distribution of breading material within the machine. The breading machine 10 also comprises a drum type conveyor 16 which is operable to distribute breading material to a hopper means 18 which is adapted to provide a top and side coating of "fresh bread" crumbs or other breading to food products passing through machine 10 on conveyor belt 14. The frame 12 may be mounted on a suitable support system so as to allow portability of the breading machine 10 to be utilized in association with a batter applying machine, or to directly feed breaded food products into a suitable cooking oven.

Figure 2:
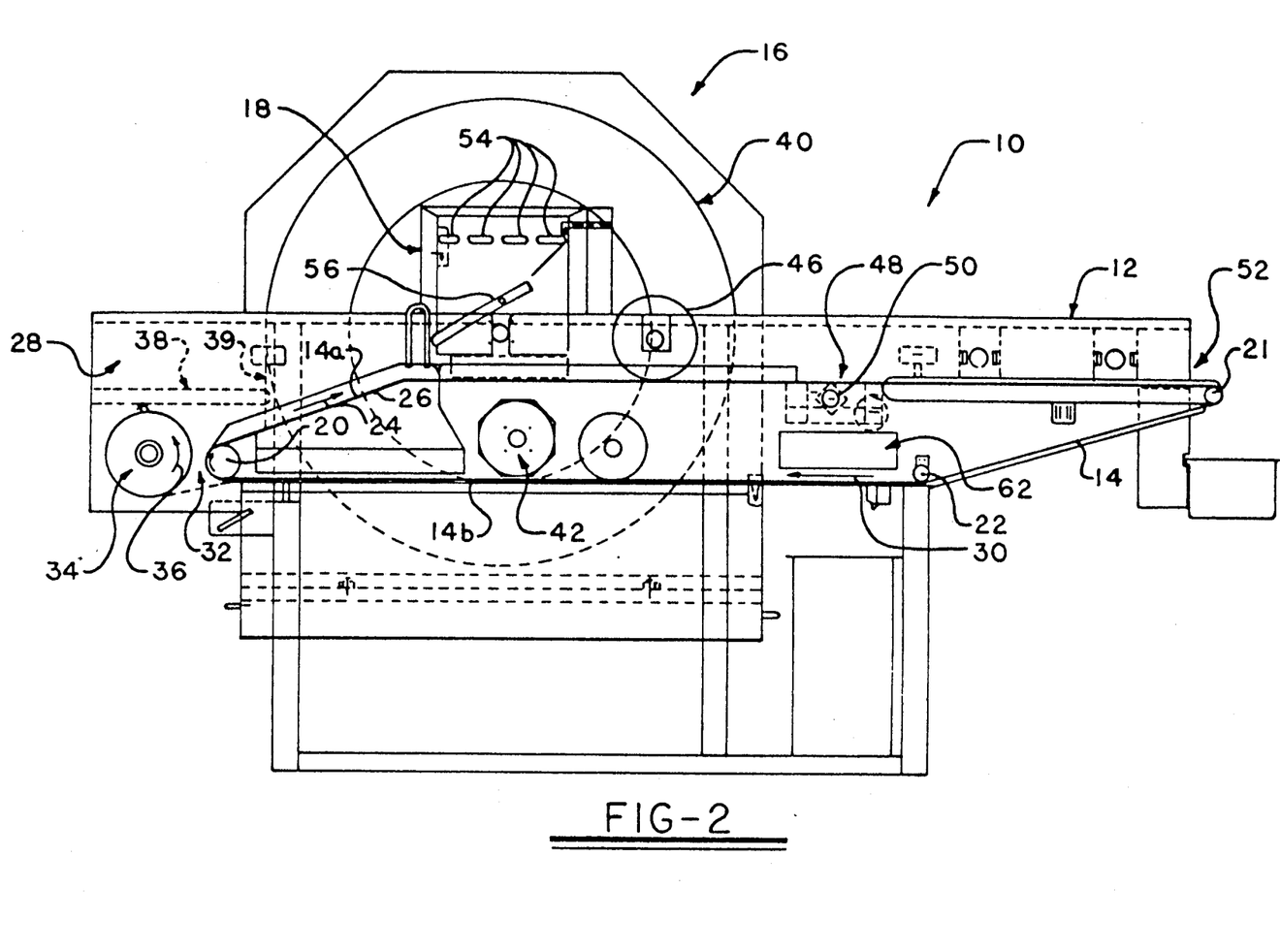
FIG. 2 is a side elevation view of the breading machine as seen in FIG. 1, along with parts thereof cut away for clarity of various internal structures.
Figure 3:
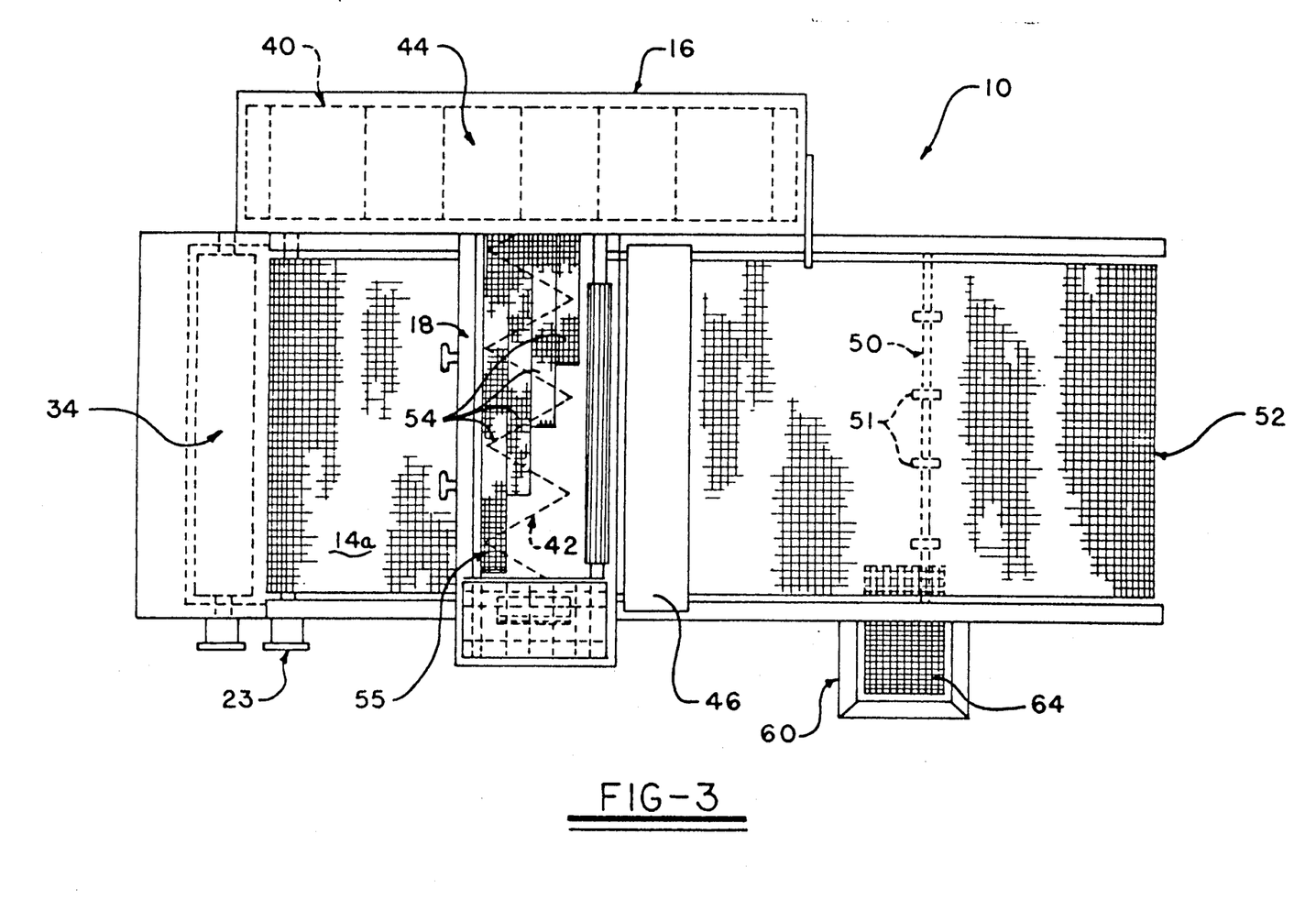
FIG. 3 is a top plan view of the breading machine as seen in FIG. 1.

Turning now to FIG. 2 and 3, the breading machine 10 is seen in more detail, wherein frame 12 is shown to be an elongated structure constructed of sheet metal of the like to form an enclosed box-like structure in which breading material is introduced and distributed for application to food products. The endless pervious product conveyor belt 14 forms an upper belt run 14a and a lower belt run 14b within the frame housing 12 and substantially along the entire length thereof. The conveyor belt 14 may be supported on a plurality of suitable roller members 20–22 wherein roller 20 is driven by a suitable motor means so as to continuously drive conveyor 14 in a clockwise direction as shown by arrow 24. In the preferred embodiment, hydraulic motors, as seen at 23 for example, are used to drive conveyor belt at a desired speed. A portion 26 of the upper belt run 14a comprises a feed-in section of the conveyor belt 14 wherein food product may be introduced into the breading machine 10 for coating thereof. Food products to be coated may be introduced into the breading machine 10 from a suitable outlet conveyor of a typical liquid batter machine (not shown) or otherwise introduced into the breading machine through the feed-in opening at 28 and/or feed-in conveyor belt run 38, so as to be disposed on portion 26 of upper belt run 14a.

A bottom layer of breading material is formed on the portion 26 of upper belt run 14a, and food products are distributed onto portion 26 where the breading material such as a "fresh bread" crumb is applied to the bottom surface of the food products, thus coating the same. The food product then travels on the upper belt run 14a toward hopper 18 which is adapted to provide a falling curtain of breading material to coat the top and side surfaces of the food products on belt 14. The hopper 18 will be described in more detail as the description proceeds, but is supplied with a breading material by means of the drum-type conveyor 16. The drum-type conveyor 16 includes a circular paddle wheel 40 which is adapted to receive and carry breading material from a lower region or pan of the frame enclosure 12, in which a lower belt run 14b travels, to the hopper 18 for distribution onto the upper and side surfaces of food products. The operation and construction of the drum-type conveyor 16 including circular paddle wheel 40 is substantially as that described in the assignees U.S. Pat. No. 4,936,248, which is hereby incorporated herein by reference. An amount of breading material is supplied to the drum-type conveyor 16 and paddle wheel 40 by means of a horizontal auger or screw 42 disposed below hopper 18 and in a bottom portion of the frame enclosure 12 so as to engage a portion of the breading material carried in the bottom pan of frame enclosure 12 by means of the lower belt run 14b. The auger 42 is rotated clockwise, wherein the bread crumb deposited on the bottom run 14b is moved by the auger 42 toward open pockets 44 of the paddle wheel 40, which then act to convey breading material upwardly to be disposed in hopper 18. Both the drum-type conveyor and screw 42 may be suitably driven by hydraulic motors at desired speeds to provide suitable operating characteristics as desired.

After the food product introduced into the breading machine 10 has been coated on both its bottom and top surfaces, the breaded product continues to move through the breading machine 10. A tamping or pressure roller 46 is placed downstream of hopper 18 to engage the food product with a slight pressure to press the breading material into firm engagement with the food product such that a high quality bread crumb coating is provided. As the food product continues to move through enclosure 12, any excess bread crumbs or breading material will be allowed or caused to fall and collect in a lower region of the frame enclosure 12. Specifically, an aperture may be provided along the upper belt run 14a at 48 downstream of the tamping roller 46, and a belt vibrator element 50 may be positioned underneath the upper belt run 14a to be rotatable on a shaft extending across frame 12. The vibrator element 50 is provided with cam surfaces or spaced knobs 51 thereon which are disposed about its periphery such that the vibrator element when rotated will provide a slight physical vibration to the conveyer belt 14 to shake excess bread crumb material therefrom. Thus, any excess bread crumb material which is carried by upper belt run 14a will be made to fall into the bottom of enclosure frame 12 and onto the lower belt run 14b therein, with the breaded food product continuing on upper belt run 14a toward an exit opening 52 of the breading machine 10.

The lower conveyor belt run 14b is adapted to move through the bottom pan portion of frame enclosure 12 in the direction of arrow 30 so as to carry any excess quantity of bread crumb therewith acting to redistribute any excess breading material back into a coating cycle within the breading machine 10. As the lower belt run 14b moves from right to left as seen in FIG. 2, excess breading material will be caused to be distributed into a space 32 adjacent the in-feed end of the conveyor belt 14. Accumulation of breading material within space 32 will result in redistribution of the breading material onto portion 26 of upper belt run 14a to maintain the layer of breading material thereon forming the bottom layer of breading for food products to be coated. The means to distribute breading material at this location includes the action of conveyor belt 14 as it rotates about roller 20 upwardly in the region 32, in combination with a roller 34 which is adapted to rotate in the counterclockwise direction as indicated by arrow 36. The spacing between the conveyor belt 14 wrapping around the roller 20 and the roller 34 is such that a "pinch" zone is formed therebetween. Although this space may be termed a "pinch" zone, the affect of the conveyor belt 14 and roller 34 on breading material within the region 32 will not significantly degrade the integrity of the breading material. Thus, fresh bread crumbs may be handled with the gentleness required to preserve the integrity of the breading material.

As mentioned previously, the drum-type conveyor 16 and paddle wheel 40 thereof provide a conveying mechanism which allows breading material to be supplied to the hopper 18 for production of the top and side coating of breading material, wherein the breading material is gently handled to maintain its integrity. The hopper 18 comprises a box-type housing positioned over the upper belt run 14a downstream and adjacent to portion 26 of the upper belt run 14a. As best seen in FIG. 3, the hopper 18 includes a plurality of transfer conveyors 54 disposed therein, which extend into the open center region of the paddle wheel 40. The transfer conveyors 54 are positioned below an aperture formed in the housing for the paddle wheel 40 adjacent the open pockets 44 thereof, such that breading material within pockets 44 will fall onto the upper run of each of the transfer conveyor belts 54 to be directed outwardly from paddle wheel 40. The plurality of transfer conveyor belts 54 each have a different longitudinal extent across the upper belt run 14a such that breading material is equally distributed across the entire width of the upper belt run 14a. Proper distribution of breading material from hopper 18 is further facilitated by endless belt conveyors 55 and 56 disposed below the transfer conveyor belts 54 as seen in FIG. 2. The conveyor 55 is suitably driven such that its inner belt run moves from top to bottom and conveyor 56 moves from right to left as viewed in FIG. 2, whereby breading material falling onto the conveyors 55 and 56 from transfer conveyors 54 will be distributed to fall onto food product being carried on upper belt run 14a of the main belt conveyor 14.

The hopper 18 is substantially similar to that described in the assignees U.S. Pat. No. 4,936,248, wherein further details of the hopper 18 and its operation may be seen with reference thereto. Although the hopper 18 is similar to that described in U.S. Pat. No. 4,936,248, it has been found that providing a larger number of transfer conveyor belts 54 as seen in FIG. 3, provides more uniform distribution of breading material from the drum-type conveyor 40 onto the conveyor 56 to provide the falling curtain of breading material onto upper belt run 14a. It should be understood that the upper run 14a of conveyor belt 14 will normally be fully loaded across its entire width with food products to obtain the most efficient operation of the apparatus, and therefore proper distribution of breading material across the entire width of conveyor belt 14 is necessary to provide a uniform coating of breading material to all food products positioned on conveyor belt 14. The conveyors 54, 55 and 56 may be driven by separate hydraulic motors to enable each to be driven at a different speed, or alternatively may be driven simultaneously with one motor.

In the assignees prior breading machine, the conveyor belt 14 was positioned within a shroud, leaving an amount of space between the conveyor belt and shroud in which breading material circulated to form the bottom breading layer. It was found that there was a tendency for the breading material to pack into the location between the conveyor belt and shroud which inhibited proper flow of breading material onto the upper run of the conveyor belt to properly form the bottom layer of breading material as desired. Such packing required operation of the breading machine to be temporarily stopped so that the packed breading material between the conveyor belt and shroud could be removed and cleaned, which created significant problems in efficient operation of the breading machine.

Figure 4:
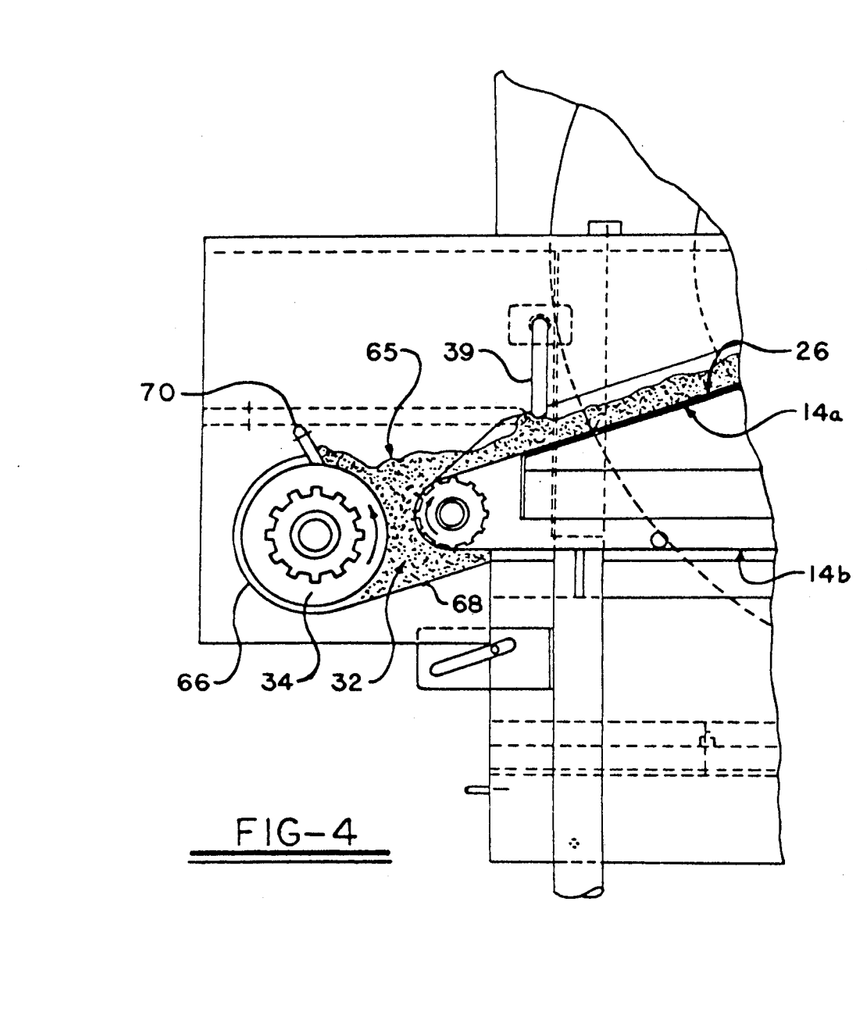
FIG. 4 is an enlarged partial cross-section of the means for generating a bottom layer of breading material on the conveyance path on which food product is disposed.

Turning now to FIG. 4, the means to provide the bottom layer of breading material on the conveyor belt 14 to alleviate congestion and packing of breading material is shown in more detail. As previously mentioned, the enclosure housing 12 essentially forms a bottom pan in which excess breading material will be distributed from the upper belt run 14a or from the feed hopper 60 of breading machine 10. The lower belt run 14b moves within the bottom pan to cause breading material to be distributed towards space 32 adjacent the in-feed end of the conveyor belt 14. As the breading material is distributed into the region 32 by means of the lower belt run 14b, the breading material will fill up the area 32 created in the bottom pan. The counter rotation of the conveyor belt 14 and the roller 36 will act to create a fluffing action to throw the breading material from space 32 onto the conveyor belt as it travels around roller 20 to form the bottom layer of breading material onto which food products to be coated will be placed. The fluffing action created by the counter rotation between the conveyor belt 14 and roller 34 occurs continuously during operation of the machine 10, wherein breading material which is thrown onto the belt 14 is then carried away from the fluffing region by continued movement of the belt 14. The fluffing action created by the counter rotation of roll 34 and conveyor belt 14 traveling around drive roller 20 insures that the breading material is transferred from region 32 onto portion 26 of the upper belt run 14a to form the bottom layer of bread crumb material as desired.

The roll 34 is positioned within a shroud 66 with very close tolerance fit, and the counter rotation of roll 34 relative to the rotation of conveyor belt 14 substantially prevents packing of breading material within the region 32. It was additionally found that flow of breading material to region 32 is facilitated by providing a bottom pan region 68 which is inclined downwardly from the bottom run 14b of the conveyor belt 14 at the location of region 32. The downward incline of bottom pan 68 at this location allows breading material packed into the conveyor belt 14 to be dislodged and facilitates conveyance of breading material towards roll 34 in region 32 to further inhibit packing of breading material and to enhance the fluffing action induced by roll 34. In the preferred embodiment, the bottom pan 68 is inclined downwardly at approximately 19° such that bread crumb material will be directed down the pan to thereafter be issued upwardly by means of the rotation of roll 34. The spacing between the conveyor belt 14 and roller 34 may be approximately 1¼ inches at the "pinch" zone therebetween, which has been found to not detrimentally affect the bread crumb material to any significant extent so as to retain the integrity of the bread crumb material. In the preferred embodiment, the roll 34 is a DELRIN ® which is easy to machine and meets FDA requirements for use with food products. The roll 34 provides a smooth hard surface, the rotation of which creates a traction affect to draw bread crumb up in the fluff zone 65. Any type of bread crumb material including free flow, j-crumb, flour as well as fresh bread crumb material can be used in machine 10 without packing or congestion thereof as desired. For various types of breading material, the speed of rotation of roll 34 relative to the speed of conveyor 14 is chosen to optimize the fluffing action created by counter rotation of roll 34 and conveyor belt 14. As an example, the roll 34 may be rotated at a speed of 120 rpms for a conveyor belt speed of 15 to 40 feet per minute for use with fresh bread crumb material. The rotational speed of roll 34 may be varied to a great extent depending upon the particular type and characteristics of breading material utilized in the machine as well as the specific operating conditions encountered. Similarly, the belt speed may be adjusted for the desired production capacity, with the rotational speed of roll 34 adjusted accordingly. In any event, the roll 34 will normally be rotated at a relatively high speed compared to the speed of conveyor belt 14 to insure proper production of the bottom layer of breading material and to prevent packing of breading material within zone 32.

From the foregoing, it should be apparent that there may be a tendency for breading material to follow roll 34 around its direction of rotation, and it therefore may be necessary to provide a scraper or knife structure 70 at the upper end of shroud 66 which is positioned closely adjacent to the outside surface of roll 34. The knife 70 facilitates the prevention of packing material on roll 34 and also limits the ability for breading to flow over the roll 34 by kicking any breading material packed on roll 34 back into fluff zone 65. The proper thickness of the bottom layer of bread crumb material which is placed upon the conveyor belt 14 on portion 26 of the upper belt run 14a is accomplished by means of a plate 39 which extends the length of the belt 14 and which is disposed at a height above the portion 26 of the upper belt run 14a to form the desired thickness of the bottom layer of bread crumb material thereon. The plate 39 may also be manufactured of a DELRIN ® material, and is adjustable horizontally by the user. Generally, the thickness of the bottom layer of breading material is chosen to be between ⅜ inch and 1 inch depending upon the particular food product to be coated.

Figure 5:
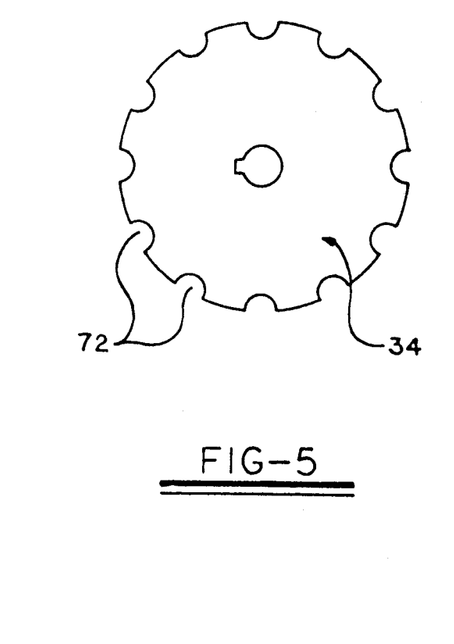
FIG. 5 is an enlarged cross-section of an alternate embodiment of the roller associated with the means for generating a bottom layer of breading material.

In an alternative embodiment as seen in FIG. 5, the roll 34 may be provided with longitudinal grooves 72 to facilitate the ability of roll 34 to draw up bread crumb material as it rotates within region 32 to create the fluffing action desired to form the bottom layer of breading material. With larger particle size breading materials such as j-crumb material, the longitudinal grooves 72 will give the roll 34 more bite to lift such larger size material and prevent packing thereof. Similarly, for higher speeds of belt 14 during production, the amount of breading material which will be required to form an adequate bottom layer increases, and the groove 72 will facilitate lifting a larger quantity of breading material as desired. Although the longitudinal grooves 72 may be advantageous with larger particle size breading material, there may be a tendency for breading material to pack into the grooves 72, especially with smaller particle size material, which would be undesirable. Therefore, the roll 34 may alternatively be provided with a roughened surface to facilitate its ability to lift breading material within region 32, such as by glass beading the surface of roll 34 as an example. Alternatively, a dimpled surface on roll 34 may be found to be advantageous.

Figure 6:
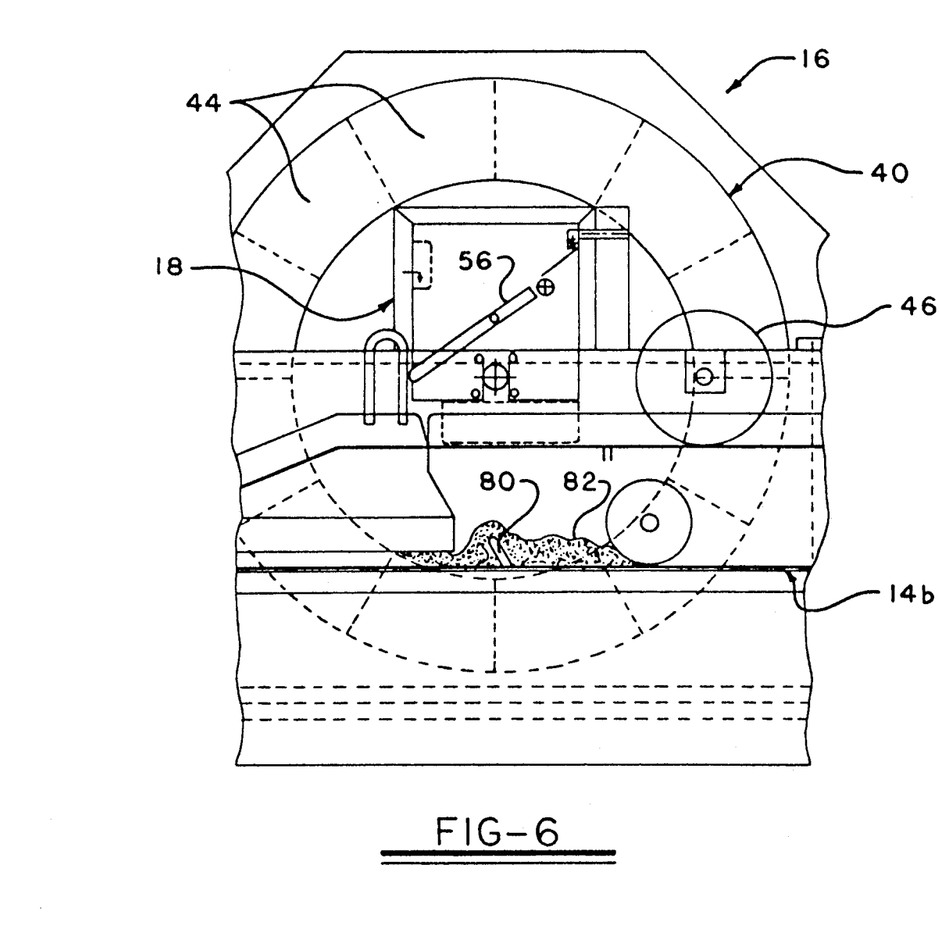
FIG. 6 shows a partial schematic side elevational view of an alternate embodiment of the breading machine of the invention, indicating particularly the areas of differentiation from the embodiment as shown in FIG. 2 and 3.

Turning now to FIG. 6, there is shown an alternative embodiment of the breading machine which enables formation of a top layer of breading material without significantly degrading the integrity thereof. It has been found that the cross feed screw 42, as described with reference to the embodiment of FIG. 2, may tend to degrade crumb integrity, especially with respect to fresh bread crumb material for which the breading machine is advantageously utilized. The cross feed screw 42 is adapted to convey an amount of breading material from the bottom pan region of enclosure housing 12 to the open pockets 44 of drum-type conveyor 40 as seen with respect to FIGS. 2 and 3. The cross feed screw 42 is advantageous in that it is a helical screw wherein only half of the screw area actually contacts and conveys breading material into the drum-type conveyor 40. This assures that a suitable amount of breading material is not only conveyed to the drum-type conveyor 40 to be distributed to hopper 18 for formation of a top layer of breading material, but also allows a suitable amount of breading material to flow therepast to subsequently form the bottom layer of breading material as desired. Although the cross feed screw 42 does allow the proper distribution of breading material to form both bottom and top layers thereof, the screw action may have a tendency to break up and degrade the crumb integrity undesirably. Therefore, as seen in FIG. 6, an alternative conveyance system may be provided in place of the cross feed screw 42, which will have less detrimental effect upon the breading material while still providing the proper distribution within breading machine 10. As an example, a wire or mesh conveyor belt 80 may be provided in the bottom pan portion of enclosure housing 12 at the location of an inlet opening formed in the drum-type conveyor 40 and accessing each of the pockets 44 formed therein and rotating past the inlet opening such that breading material from bottom pan region of enclosure housing 12 may be conveyed into each of the pockets 44 for distribution to hopper 18. The conveyor belt 80 will extend across the entire width of the bottom pan region of housing 12 and may be an endless belt conveyor which has an upper run moving in the direction toward drum-type conveyor 40. As seen in FIG. 6, breading material 82 which is flowing from right to left within the bottom pan region of housing 12 along with the lower belt run 14b, will be made to flow onto feed conveyor 80 to some extent, wherein a portion thereof will be directed to the open pockets 44 of drum-type conveyor 40. The feed conveyor 80 may be approximately 2 to 3 inches wide, and its speed controlled to distribute the proper amount of breading material to the drum-type conveyor 40 to be supplied to hopper 18 as desired. It is also seen in FIG. 6 that an amount of breading material 82 will flow over feed conveyor 80 and continue within bottom pan region of housing 12 to subsequently form the bottom layer of breading material as previously described. This is accomplished by constructing feed conveyor 80 as having relatively small dimensions such that a suitable amount of breading material will flow thereover, which positioning it slightly within the bottom pan region of housing 12 so as to intercept a suitable amount of breading material 82 for conveyance to drum-type conveyor 40. The feed conveyor 80 may be tilted towards vertical as seen in FIG. 6 so as to properly intercept an amount of breading material flowing within the bottom pan region, or alternatively may be positioned horizontally within the pan and run at a suitable speed to intercept and convey the proper amount of breading material from bottom pan region to the drum-type conveyor 40. It should be evident that the feed conveyor 80 avoids any screw action or grinding effect which may have occurred with a cross feed screw 42 as previously described, and therefore will avoid bread crumb breakdown or degradation as desired. Although a wire or mesh belt conveyor is conveniently utilized, a polybelt may also be advantageously used for the feed conveyor 80, wherein ribs may be provided on the polybelt to facilitate conveyance of breading material to the drum-type conveyor 40. It should also recognized that other conveyance means may be suitably used to feed breading material into drum type conveyor 40, while avoiding degradation of the material as desired.

Figure 7:
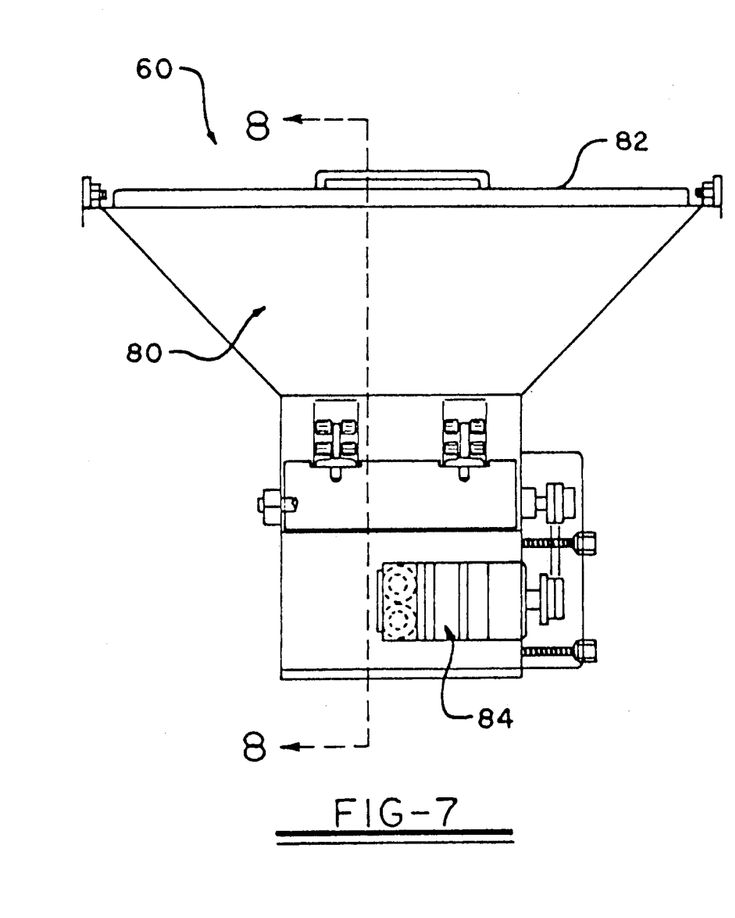
FIG. 7 is a side elevation view of the feeder assembly associated with the breading machine of the invention.
Figure 8:
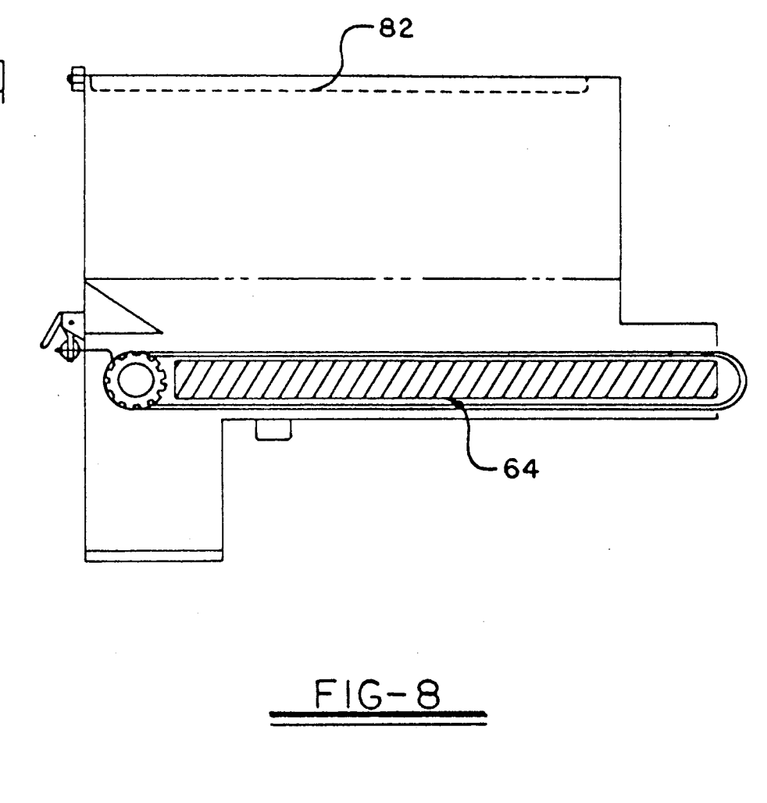
FIG. 8 is a cross-section of the feeder assembly as taken along the line 8—8 of FIG. 7.

It is also noted that the assignees prior U.S. Pat. No. 4,936,248 included a feed hopper unit which was associated with the hopper structure to provide the top coating of breading material in the apparatus. The feed hopper was positioned toward the front of the breading machine, and enabled an amount of breading material to be added therein to be distributed into the hopper to initially create a top layer of breading material, and subsequently to create a bottom layer after continued distribution of the breading material during operation. With this structure, the creation of a bottom layer of breading material took some time, and uniform distribution of breading material within the breading machine 10 was delayed after initial introduction of breading material into the feed hopper. The present invention therefore has provided a feed hopper 60, which as seen in FIG. 3, is disposed toward the center of the breading machine 10 and between the upper belt run 14a and lower belt run 14b of the main conveyor belt 14 as seen in FIG. 2 at opening 62 in enclosure housing 12. The feed hopper 60 is shown in FIGS. 7 and 8, and includes an endless conveyor belt 64 which is adapted to extend into enclosure housing 12 such that any breading material disposed within feed hopper 60 will be conveyed directly into housing 12 to be distributed for coating of food products therein. The feed hopper 60 further includes a large enclosed housing 90 which will accommodate a large volume of breading material, and may have a lid 92 associated therewith. The sides of housing 90 are angled downwardly toward conveyor 64 to urge any breading material in housing 90 continuously toward conveyor 64 for distribution into breading machine 10 A separate hydraulic motor 94 may be associated with the feed hopper 60 to provide direct drive for conveyor 64 therein. The conveyor 64 can thereby be driven at any desired operating speed in a selective manner for either initial start up of the breading machine wherein a large volume of breading material will be required to be distributed into machine 10 via feed hopper 60, or alternatively to selectively introduce an additional amount of breading material into breading machine 10 during an operating cycle. The feed hopper 60 provides positive feed of breading material into breading machine 10 at a position to enable both bottom and top layers of breading material to be directly and more immediately generated in machine 10. In initial start up, the feed hopper 60 allows machine 10 to operate at full and complete cycle with both bottom and top layers of breading material being generated in the proper amount and proper distribution quickly and easily. During production, if either or both of the top and bottom layers of breading material become weak as to the amount or distribution, additional breading material is quickly and easily added to feed hopper 60 to immediately compensate for the amount and provide proper distribution of added breading material within the breading machine.

Having described preferred embodiments of the breading machine incorporating the present invention, it will be realized that the same is susceptible to various modifications and arrangements of parts without departing from the inventive concept thereof as is defined in the appended claims.

What is claimed is:

1. A coating machine for depositing coating material onto a food product comprising,
   an elongated frame enclosure having an endless pervious conveyor belt supported therein and extending therealong to define an upper conveyor run providing a product conveyance path and a lower conveyor run,
   drive means for moving said conveyor belt within said frame enclosure such that said conveyor belt moves in a first direction along said upper conveyor run and in the opposite direction along said lower conveyor run, wherein said drive means includes at least one support roller adapted to engage said conveyor belt,
   a first hopper means comprising a housing supported on said frame enclosure above said upper conveyor run with distribution means provided in said hopper means for distributing coating material disposed therein across the width of said upper conveyor run,
   a circular conveyor rotatably supported on said frame enclosure adjacent to said hopper means and said bottom conveyor run having a plurality of pocket means formed therein and opening to the center thereof,
   conveyance means supported in said frame enclosure and extending transversely across said bottom conveyor run with one end thereof extending into said circular conveyor, and having drive means associated therewith to remove a portion of coating material from said bottom conveyor run to be disposed within said pocket means of said circular conveyor, wherein said pocket means will convey coating material disposed therein to said hopper means with said distribution means accepting the portion of said coating material from said pocket means to be distributed to said hopper means, and said coating material thereafter exiting from said hopper means and onto the food product being carried on said upper conveyor run as said food product passes under said hopper means,
   means to provide a bottom layer of coating material on said upper conveyor run comprising a roller means positioned in spaced apart relationship to said support roller and having drive means associated therewith to rotate said roller means in an opposite direction relative to said support roller, wherein said lower conveyor run is adapted to distribute coating material to the space between said roller means and said at least one support roller, such that said coating material will be distributed onto said upper conveyor run by means of the counter rotation of said at least one support roller and said roller means so as to provide a bottom layer of coating material on which food products are positioned to be coated therewith.

2. The coating machine of claim 1, wherein, said roller means is rotated at a first rotational speed and said support roller is rotated at a second rotational speed, wherein said first and second rotational speeds are different.

3. The coating machine of claim 2, wherein said first rotational speed is greater than said second rotational speed to facilitate distribution of said coating material onto said upper conveyor run to form said bottom layer of coating material.

4. The coating machine of claim 1, wherein, said roller means has a smooth outer surface.

5. The coating machine of claim 1, wherein, said roller means has grooves formed in the outer surface thereof.

6. The coating machine of claim 1, wherein, said roller means has a roughened outer surface.

7. The coating machine of claim 1, wherein, said conveyance means is an auger screw supported in said frame enclosure and extending transversely across said bottom conveyor run wherein a portion of said screw contacts excess coating material traveling along said bottom conveyor run so as to convey a portion thereof to said circular conveyor.

8. The coating machine of claim 1, wherein, said conveyance means is a second conveyor belt supported in said frame enclosure and extending transversely across said bottom conveyor run and positioned so as to contact a portion of coating material from said bottom conveyor run and acting to convey said portion to said circular conveyor.

9. The coating machine as in claim 8, wherein, said second conveyor belt is disposed at an inclined position relative to said bottom conveyor run.

10. The coating machine of claim 1, further comprising,
    a feed hopper means comprising a housing supported on said frame enclosure at a position between said upper conveyor run and said lower conveyor run and having means for conveying a coating material introduced into the housing thereof into said frame enclosure for distribution into a coating cycle within the coating machine.

11. The coating machine of claim 10, wherein, said position of said feed hopper is such that coating material is introduced into said frame enclosure at a point on said lower conveyor run prior to said conveyance means extending transversely across said lower conveyor run.

12. The breading machine of claim 1, wherein, said bottom portion of said frame enclosure forms a pan in which excess coating material is made to fall wherein said lower conveyor run acts to draw along said excess coating material for redistribution thereof into a coating cycle within the coating machine.

13. A coating machine for distributing coating material onto the surfaces of food products comprising,
   a frame enclosure having a first conveyor means therein and defining an upper conveyor run along which food product to be coated is positioned and a lower conveyor run,
   drive means for moving said first conveyor means in a first direction along said upper conveyor run and in an opposite direction along said lower conveyor run and including at least one support roller positioned at the transition between said upper and lower conveyor runs,
   means to provide a top layer of coating material which will be distributed onto the top and side surfaces of food products on said upper conveyor run,
   means to provide a bottom layer of coating material which will be distributed on said upper conveyor run onto which food product to be coated will be placed, said means to provide a bottom layer including at least one roller means positioned in spaced relationship with said at least one support roller, wherein a pinch zone is created between said at least one roller means and said at least one support roller which acts to distribute coating material from said lower conveyor run to said upper conveyor run.

* * * * *